(12) United States Patent
MacDonald

(10) Patent No.: US 9,608,946 B2
(45) Date of Patent: *Mar. 28, 2017

(54) RETRIEVAL OF STORED TRANSMISSIONS

(71) Applicant: Skype, Dublin (IE)

(72) Inventor: Derek MacDonald, Palo Alto, CA (US)

(73) Assignee: Skype, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 14/704,501

(22) Filed: May 5, 2015

(65) Prior Publication Data
US 2015/0372951 A1    Dec. 24, 2015

Related U.S. Application Data

(63) Continuation of application No. 13/209,725, filed on Aug. 15, 2011, now Pat. No. 9,043,410.

(51) Int. Cl.
*G06F 15/16* (2006.01)
*H04L 12/58* (2006.01)

(52) U.S. Cl.
CPC ............. *H04L 51/04* (2013.01); *H04L 51/16* (2013.01)

(58) Field of Classification Search
CPC ...................................................... H04L 51/04
See application file for complete search history.

(56) References Cited

U.S. PATENT DOCUMENTS

| 6,799,033 | B2 * | 9/2004 | Kanefsky | .......... | H04M 1/72552 |
| | | | | | 455/412.1 |
| 7,295,836 | B2 | 11/2007 | Yach et al. | | |
| 7,826,406 | B2 * | 11/2010 | Burns | ..................... | H04W 4/12 |
| | | | | | 370/310 |
| 8,275,839 | B2 | 9/2012 | Auerbach et al. | | |
| 8,452,854 | B2 | 5/2013 | Plestid | | |
| 9,043,410 | B2 | 5/2015 | MacDonald | | |

(Continued)

FOREIGN PATENT DOCUMENTS

| CN | 1585384 | 2/2005 |
| CN | 101272358 | 9/2008 |
| EP | 1746790 | 9/2009 |

OTHER PUBLICATIONS

"Advisory Action", U.S. Appl. No. 13/209,725, filed Dec. 9, 2014, 3 pages.

(Continued)

*Primary Examiner* — Gerald Smarth

(57) ABSTRACT

An instant messaging client application is executed on a first terminal, to participate in threads of instant messaging between user terminals over a packet-based network, each thread comprising exchanging text-based messages between the user terminals of a selected group of contacts comprising the first user and at least one second user. A digital record of the messages is maintained in a data storage medium. A further text-based message is received from one of the second terminals over the packet-based network, comprising a citation of a cited one of the text-based messages previously transmitted over the packet-based communication network and stored in the storage medium. The further message is processed at the first terminal so as, by reference to the storage medium, to recover a context of the cited message in relation to others of the text-based messages in the respective thread.

20 Claims, 12 Drawing Sheets

(56) References Cited

U.S. PATENT DOCUMENTS

| | | | |
|---|---|---|---|
| 9,210,112 B2* | 12/2015 | Song | |
| 2003/0105816 A1 | 6/2003 | Goswami | |
| 2004/0172405 A1 | 9/2004 | Farran | |
| 2004/0202117 A1 | 10/2004 | Wilson et al. | |
| 2004/0205175 A1 | 10/2004 | Kammerer | |
| 2005/0091321 A1 | 4/2005 | Daniell et al. | |
| 2006/0218492 A1 | 9/2006 | Andrade | |
| 2007/0143423 A1 | 6/2007 | Kieselbach et al. | |
| 2008/0144784 A1* | 6/2008 | Limberg | G06Q 10/107 379/88.14 |
| 2009/0327247 A1 | 12/2009 | Jia et al. | |
| 2010/0217837 A1 | 8/2010 | Ansari et al. | |
| 2010/0278453 A1 | 11/2010 | King | |
| 2011/0055309 A1 | 3/2011 | Gibor et al. | |
| 2011/0145602 A1 | 6/2011 | Ginter et al. | |
| 2011/0191429 A1* | 8/2011 | Tu | G06F 15/16 709/206 |
| 2011/0225592 A1 | 9/2011 | Goldin | |
| 2011/0237279 A1 | 9/2011 | Boudreau et al. | |
| 2011/0239158 A1 | 9/2011 | Barraclough et al. | |
| 2012/0226742 A1 | 9/2012 | Momchilov et al. | |
| 2012/0324365 A1 | 12/2012 | Momchilov et al. | |
| 2013/0007137 A1 | 1/2013 | Azzam et al. | |
| 2013/0024780 A1* | 1/2013 | Sutedja | G06Q 10/107 715/752 |
| 2013/0046830 A1 | 2/2013 | MacDonald | |

OTHER PUBLICATIONS

"Final Office Action", U.S. Appl. No. 13/209,725, filed Jul. 29, 2014, 29 pages.

"Final Office Action", U.S. Appl. No. 13/209,725, filed Sep. 10, 2013, 27 pages.

"International Search Report and Written Opinion", Application No. PCT/US2012/051014, Nov. 19, 2012, 9 pages.

"Non-Final Office Action", U.S. Appl. No. 13/209,725, filed Feb. 15, 2013, 28 pages.

"Non-Final Office Action", U.S. Appl. No. 13/209,725, filed Jan. 6, 2014, 30 pages.

"Notice of Allowance", U.S. Appl. No. 13/209,725, filed Jan. 22, 2015, 11 pages.

"Foreign Office Action", CN Application No. 201280039850.1, May 3, 2016, 6 pages.

"Foreign Office Action", CN Application No. 201280039850.1, Oct. 9, 2015, 13 pages.

* cited by examiner

RETRIEVAL OF STORED TRANSMISSIONS

RELATED APPLICATION

This application is a continuation of, and claims priority to U.S. patent application Ser. No. 13/209,725 filed Aug. 15, 2011 entitled Retrieval of Stored Transmissions, the disclosure of which is incorporated by reference herein in its entirety.

FIELD OF THE INVENTION

The present invention relates to an improved system and method for the retrieval of stored transmissions transmitted and received over a packet-based communication network.

BACKGROUND

Modern packet-based communication networks such as the Internet have developed to allow highly efficient transmission of large quantities of traffic between users of different user terminals. One popular mode of communication that can be implemented over a packet-based network is the exchange of text-based messages between the user terminals of two or more users who have selected to become mutual contacts of one another. This is sometimes referred to as "Instant Messaging" (IM) or "IM chat".

To participate in the instant messaging each user executes an instant messaging client application on his or her respective terminal. When executed, the IM client allows the user to make or accept contact requests to or from other users of the instant messaging system and thereby become pre-agreed contacts, and to then establish a communication connection with one or more of those contacts so as to send and receive text-based messages over the network. Related messages, e.g. between the same group of participants, are concatenated by the IM client into a sequential thread which can be displayed as such in an appropriate window, pane or panel of the client.

IM chat messages are typically exchanged in real-time, although some systems may also provide a server which can store messages for later delivery if one of the contacts involved in a particular thread is offline at the time the message is sent.

An IM chat client may also include various tools to enhance its functionality, such as the ability to insert emoticons into chat messages, the provision of presence information indicating the online availability of contacts (which may be defined at least in part by the users themselves), a search facility, and/or the ability to cut and paste quotes from an earlier message of a thread into a new message of that thread or another thread. Furthermore, some IM chat clients may support additional types of communication such as file transfer and/or packet-based voice or video calling, e.g. voice-over-Internet Protocol (VoIP).

SUMMARY

However, as the amount data being exchanged and stored over the network becomes more and more profligate, there is a danger this can have a self-defeating effect in that any particular piece of information may become lost to the user amongst the increasing number of communications being transmitted, received and stored over the network. The increased traffic over a communication network can only realise its full potential if supported by a suitable data retrieval system for probing the records of messages that have been transmitted over the network.

The ability to cut and paste quotations from one message to another, either within a thread or between threads, allows users to manually remind one another of specific messages. However, the feature is still currently limited. It would be desirable to provide a data retrieval mechanism by which to enhance the usefulness of stored records of transmitted messages.

According to one aspect of the present invention, there is provided a method of operating a first user terminal of a first user, comprising: executing an instant messaging client application on the first terminal so as to participate in one or more threads of instant messaging between user terminals over a packet-based communication network, each thread comprising exchanging a respective plurality of text-based messages between the user terminals of a selected group of contacts comprising the first user and at least one second user, wherein a digital record of the text-based messages is maintained in a data storage medium; receiving a further one or more of said text-based messages from one of the second terminals over the packet-based communication network, the one or more further messages each comprising a citation of a cited one of said text-based messages previously transmitted over the packet-based communication network and stored in the storage medium; and processing the one or more further messages at the first terminal so as, by reference to the storage medium, to recover a context of the cited message in relation to others of the text-based messages in the respective thread.

Preferably the further message comprises a human-readable citation of the cited message and a computer-readable token identifying the cited message; and said processing comprises processing the computer-readable token at the first terminal so as, by reference to the storage medium, to recover the context of the cited message in relation to others of the text-based messages in the respective thread.

In embodiments said recovery of the context may comprise retrieving said others of the text-based messages from the storage medium for output to a user of the first terminal.

Said recovery of the context may comprise generating a user-operable link and, when the link is actuated by the user, outputting said other text-based messages to the user and outputting the cited message to the user in context of those other messages.

The first terminal may be used to participate in a plurality of said threads, and said further message may be part of a different thread than the cited message, wherein the link when actuated may automatically operate the first terminal to switch between the threads.

The method may comprise performing an authorization procedure at the first terminal to ensure said switching is conditional upon the user having been a legitimate participant of the thread of the cited message.

Said further message may be part of a same thread as the cited message, wherein the link when actuated may automatically operate the first terminal to scroll up through a message window to the cited message.

Said recovery of the context may comprise generating an indicator directing a user of the first terminal toward a user control enabling retrieval of said others of the text-based messages and output of the cited message in context of said other text-based messages.

The storage medium may be located at the first terminal and the method may comprise maintaining the record at the first terminal.

The storage medium may be located at a server.

The method may comprise auto-detecting the thread of one of said text-based messages when it is composed by the first user at the first terminal.

The auto-detection may be based on at least one of: one or more keywords in the text-based message; and a linguistic analysis of the text-based message.

The method may comprise receiving a further one or more of said text-based messages from one of the second terminals over the packet-based communication network, wherein the one or more further messages may each comprise a respective citation of a cited one of said text-based messages previously transmitted over the packet-based communication network and stored in the storage medium, and each of the one or more citations may comprise a human-readable citation of the respective cited message and a computer-readable token identifying the respective cited message; processing the one or more further messages at the first terminal based on the machine-readable tokens so as, by reference to the storage medium, to recover a context of the respective cited message in relation to others of the text-based messages in the respective thread; and generating a visual map of linked threads based on said machine-readable tokens.

According to another aspect of the present invention, there is provided a first user terminal of a first user, comprising: a transceiver for connecting to a packet-based network an instant messaging client application; and a processing apparatus arranged to execute the instant messaging client application so as to participate in one or more threads of instant messaging between user terminals over the packet-based communication network, each thread comprising exchanging a respective plurality of text-based messages between the user terminals of a selected group of contacts comprising the first user and at least one second user, wherein a digital record of the text-based messages is maintained in a data storage medium; wherein the transceiver is arranged to receive a further one or more of said text-based messages from one of the second terminals over the packet-based communication network, the one or more further messages each comprising a citation of a cited one of said text-based messages previously transmitted over the packet-based communication network and stored in the storage medium; and the instant messaging client application is configured, so as when executed on the processing apparatus, to process the one or more further messages at the first terminal so as, by reference to the storage medium, to recover a context of the cited message in relation to others of the text-based messages in the respective thread.

In embodiments the first user terminal may be further configured to perform operations in accordance with any of the above method features.

According to another aspect of the present invention, there is provided an instant messaging client application embodied on a non-transitory computer-readable medium and comprising code configured so as when executed on a first terminal to: participate in one or more threads of instant messaging between user terminals over a packet-based communication network, each thread comprising exchanging a respective plurality of text-based messages between the user terminals of a selected group of contacts comprising the first user and at least one second user, wherein a digital record of the text-based messages is maintained in a data storage medium; receive a further one or more of said text-based messages from one of the second terminals over the packet-based communication network, the one or more further messages each comprising a citation of a cited one of said text-based messages previously transmitted over the packet-based communication network and stored in the storage medium; and process the one or more further messages at the first terminal so as, by reference to the storage medium, to recover a context of the cited message in relation to others of the text-based messages in the respective thread.

In embodiments the instant messaging client application may be further configured to perform operations in accordance with any of the above method features.

According to another aspect of the present invention there is provided a method of operating a second user terminal, comprising: executing an instant messaging client application on the second terminal so as to participate in one or more threads of instant messaging between user terminals over a packet-based communication network, each thread comprising exchanging a respective plurality of text-based messages between the user terminals of a selected group of contacts comprising the second user and at least one first user of a first user terminal, wherein a digital record of the text-based messages is maintained in a data storage medium; generating a further one of said text-based message comprising a human readable citation of a cited one of said text-based messages that has been previously transmitted over the packet-based communication network and stored in the storage medium; and inserting a computer-readable token into the further message, the computer-readable token identifying the cited message; and transmitting the further message from the second terminals to one of the first terminals over the packet-based communication network; such that the first terminal is enabled, by processing the computer-readable token with reference to the storage medium, to recover a context of the cited message in relation to others of the text-based messages in the respective thread.

According to another aspect of the present invention, there is provided a second user terminal, comprising: a transceiver for connecting to a packet-based network; an instant messaging client application; and a processing apparatus arranged to execute the an instant messaging client application on the second terminal so as to participate in one or more threads of instant messaging between user terminals over the packet-based communication network, each thread comprising exchanging a respective plurality of text-based messages between the user terminals of a selected group of contacts comprising the second user and at least one first user of a first user terminal, wherein a digital record of the text-based messages is maintained in a data storage medium; wherein the instant messaging client application is configured so as when executed on the processing apparatus to: generate a further one of said text-based message comprising a human readable citation of a cited one of said text-based messages that has been previously transmitted over the packet-based communication network and stored in the storage medium; insert a computer-readable token into the further message, the computer-readable token identifying the cited message; and transmit the further message from the second terminals to one of the first terminals over the packet-based communication network; such that the first terminal is enabled, by processing the computer-readable token with reference to the storage medium, to recover a context of the cited message in relation to others of the text-based messages in the respective thread.

According to another aspect of the present invention, there is provided an instant messaging client application embodied on a non-transient computer-readable medium and comprising code configured so as when executed on a second terminal to: participate in one or more threads of instant messaging between user terminals over a packet-based communication network, each thread comprising exchanging a respective plurality of text-based messages between the user terminals of a selected group of contacts comprising the second user and at least one first user of a first user terminal, wherein a digital record of the text-based messages is maintained in a data storage medium; generate a further one of said text-based message comprising a human readable citation of a cited one of said text-based messages that has been previously transmitted over the packet-based communication network and stored in the storage medium; and insert a computer-readable token into the further message, the computer-readable token identifying the cited message; and transmit the further message from the second terminals to one of the first terminals over the packet-based communication network; such that the first terminal is enabled, by processing the computer-readable token with reference to the storage medium, to recover a context of the cited message in relation to others of the text-based messages in the respective thread.

BRIEF DESCRIPTION OF THE DRAWINGS

For a better understanding of the present invention and to show how it may be put into effect, reference is made by way of example to the accompanying drawings in which.

DETAILED DESCRIPTION

Overview

Figure 1:
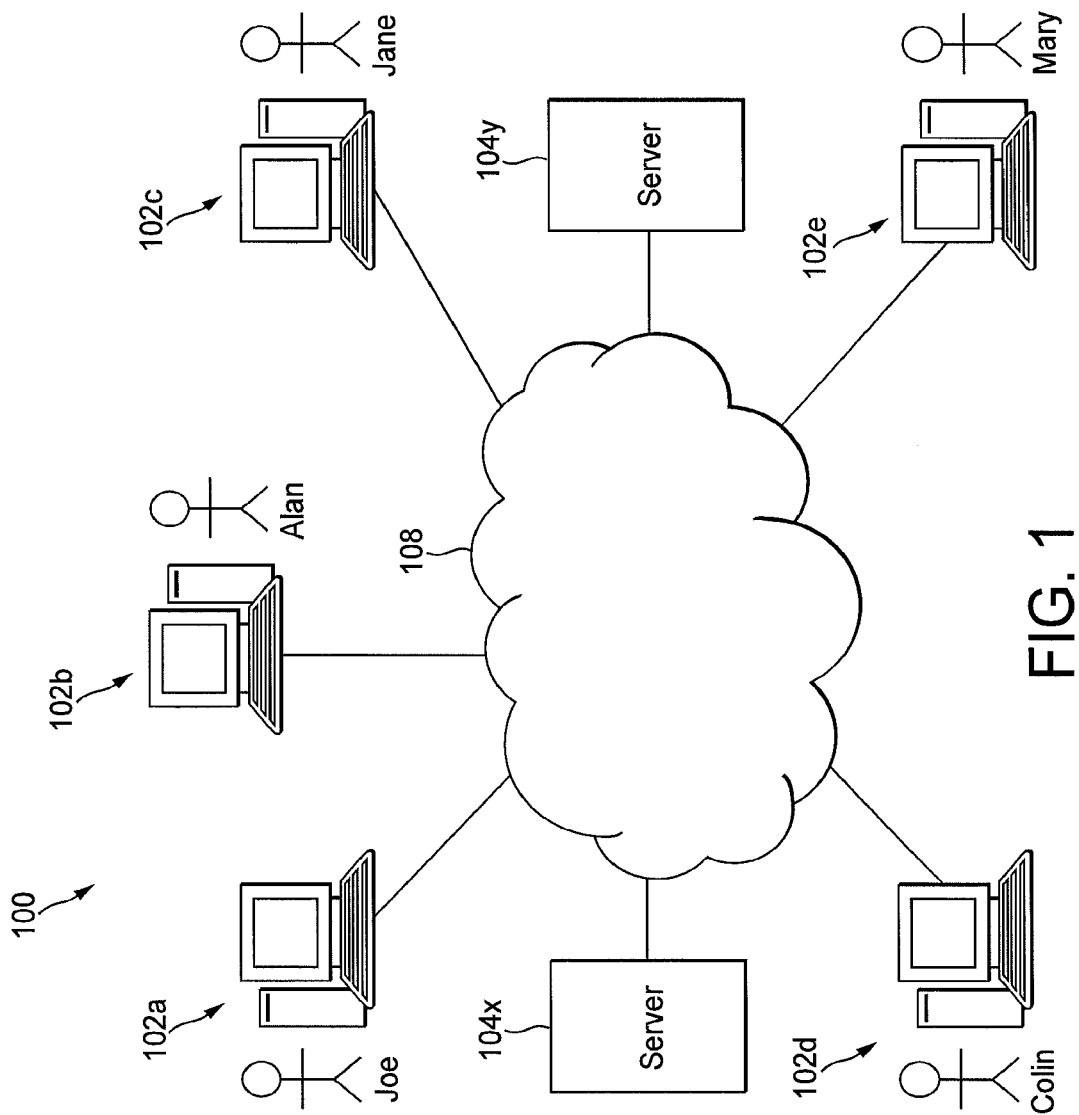
FIG. 1 is a schematic representation of a communication network.
Figure 2:
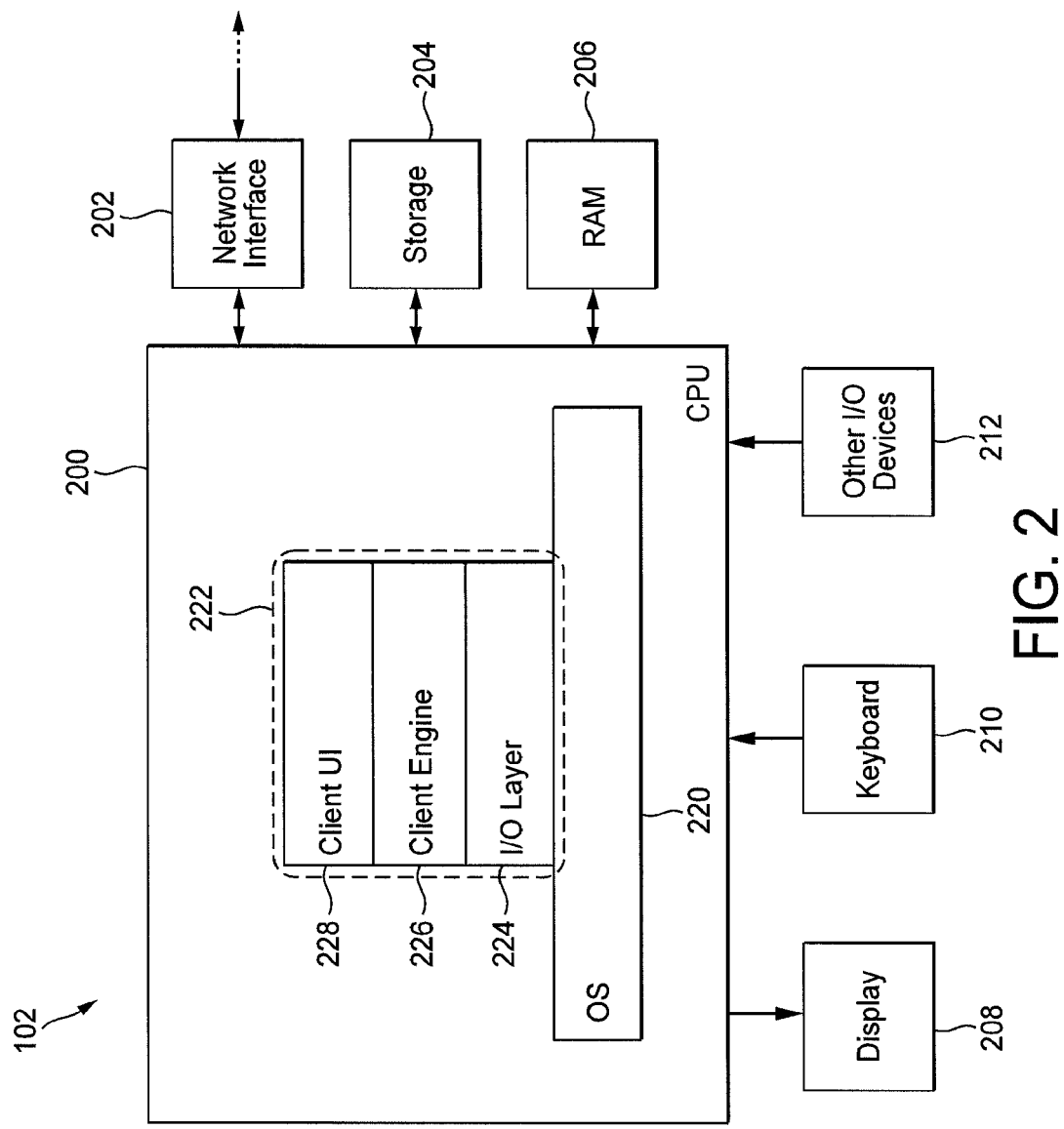
FIG. 2 is a schematic block diagram of a user terminal.

FIGS. 1 and 2 schematically illustrate a packet-based communication system 100, in this case an instant messaging system implemented over a packet-based network such as the Internet 102, 104, 108. A plurality of end-user terminals 102 and servers 104 are each connected to the rest of the Internet, represented schematically as a communication "cloud" 108 comprising a plurality of inter-networked routing nodes for routing packets of data between the user terminals 102 and/or servers 104. Each of the connections between a user terminal 102 and the cloud 108 may comprise a link via a wired or wireless modem, and may or may not be made via another network such as a local area network or packet-based service of a cellular network operator, etc. Details of the various possible arrangements for accessing the Internet will be familiar to a person skilled in the art.

In order to implement the instant messaging system for sending text-based messages between contacts, each of a plurality of user terminals 102 is installed with a respective instance of a communication client application 222, as shown in FIG. 2. The communication client 222 may be referred to herein as an instant messaging or IM client, but it will be understood that in embodiments the IM client may in fact also provide a number of additional communication types over the Internet, such as packet-based voice or video calling (e.g. VoIP) and/or file transfers. Indeed, the voice, or video calling functionality may in fact be considered the "main" purpose of the client from the perspective of the user, with the IM being an additional "secondary" feature, but since this application relates to text-based messaging then the client 222 may be referred to for convenience in relation to the example embodiments as an IM client regardless of its other accompanying features.

As shown in FIG. 2, the user terminal 102 comprises a processing apparatus 200 in the form of one or more CPUs. The processing apparatus 200 is operatively coupled to a plurality of devices: a network interface 202 for connecting to the Internet 108, a non-volatile storage medium 204 such as an internal or external hard drive and/or flash memory, a volatile storage medium in the form of a RAM 206, a display 208 such as an LED or LCD screen, a user input device 210 such as a keyboard or touch screen system capable of receiving text inputs, and one or more other input and/or output devices 212. The terminal 102 is installed with the instance of the communication client 202, in that the client 222 is stored in the non-volatile storage medium 204 and arranged for execution on the processing apparatus 200 (typically under control of an operating system 220 also running on the processing apparatus 200). The client application 222 comprises an I/O layer 224, a client engine layer 226 and a client user interface (UI) layer 228.

In operation, the I/O layer 224 handles the lower-level codecs for encoding and decoding text, voice and/or video communications for the purpose of transmission over the Internet. The client engine 226 is then responsible for managing a list of contacts and for establishing communication channels with the instance of the client application 222 running on the other user terminals 102 of selected contacts. The UI layer 228 is responsible for outputting an on-screen user interface to the user via the display 208, including IM chat messages and on-screen controls.

Figure 3A:
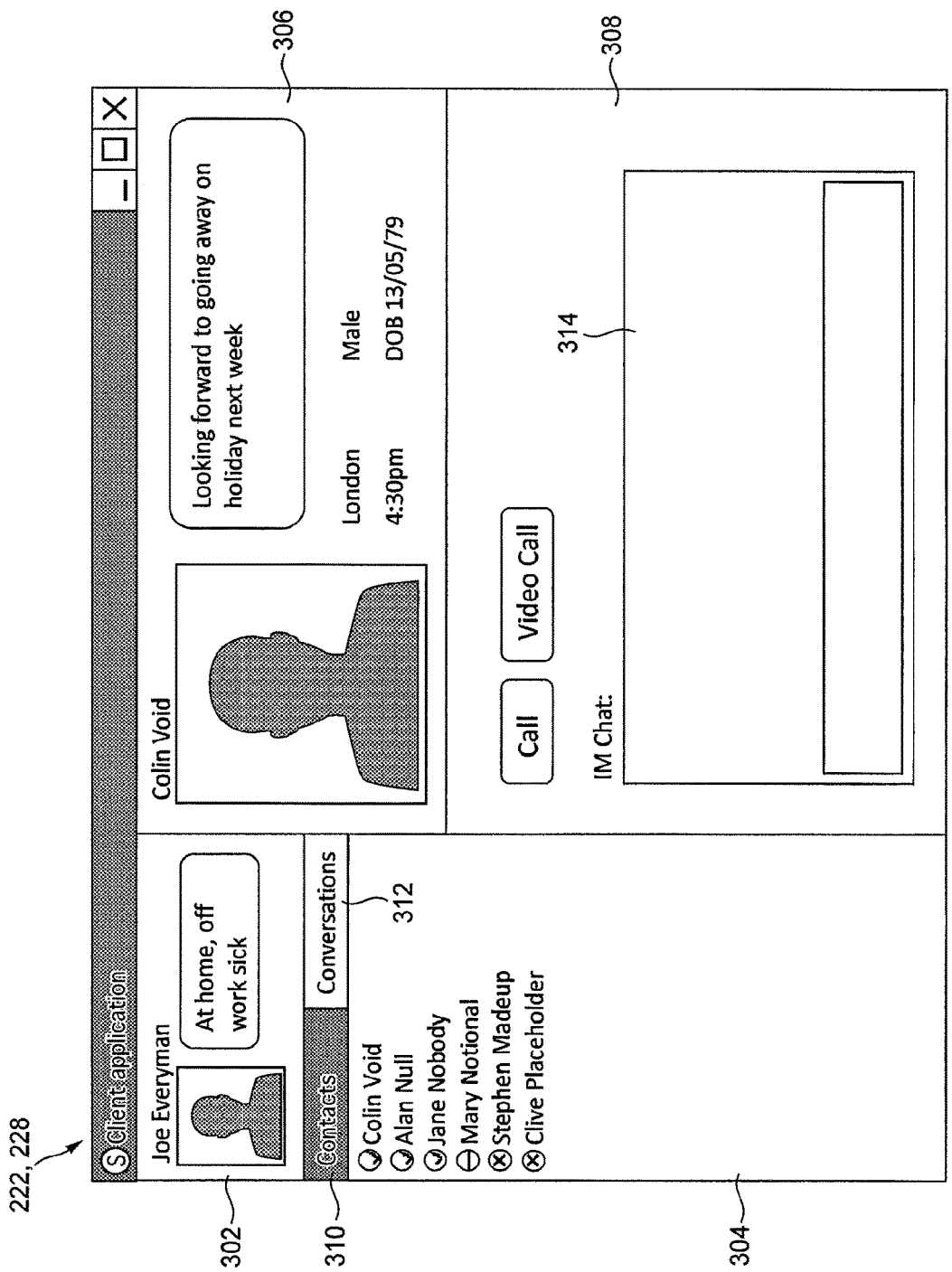
FIGS. 3a-3g provide schematic illustrations of a user interface.
Figure 3B:
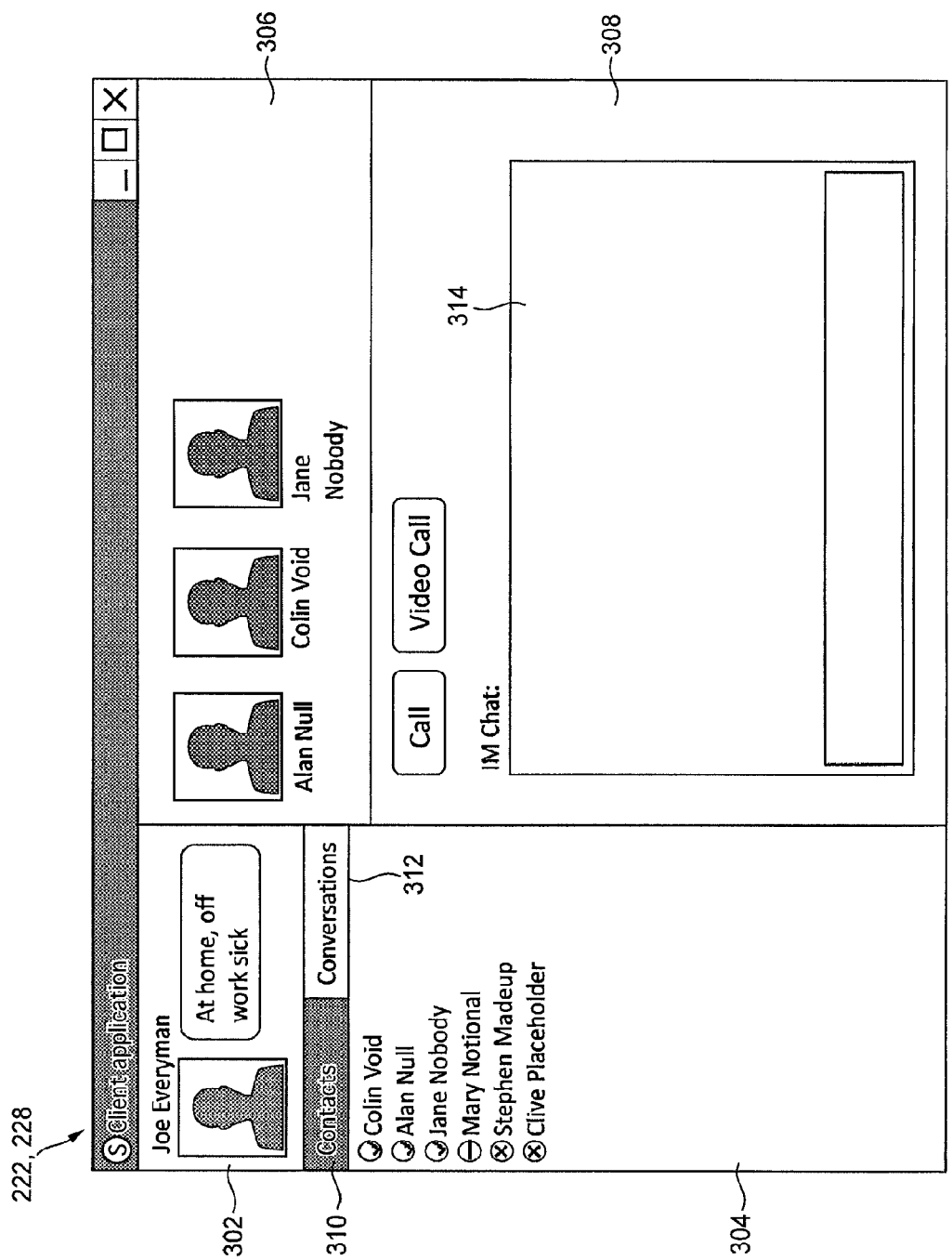

FIGS. 3a and 3b give a schematic illustration of an exemplary user interface of the client application 222 as displayed to the user, implemented by the UI layer 228. The user interface may comprise a number of windows, panels or panes 302, 304, 306, 308 (the terms are not intended herein to be overly limiting and can be used interchangeably to refer to any portion of a user interface).

For example, the user interface may comprise a first profile panel 302 in which is displayed profile information of the local user. This could display for example the user's actual name or username (not necessarily the same), a profile picture of the user or "avatar image" chosen by the user to represent him or herself, and/or a "mood message" giving a short statement composed by the user to summarise his or her current status, etc.

The user interface may also comprise a contacts panel 304 in which a list of the local user's contacts is displayed. The contacts in the contact list are other, remote users of the IM system having their own respective instances of the client application 222 installed in their respective terminals 102. The contact list is managed by the client engine 226 and may be stored either locally in a storage medium 204 at the user terminal 102 itself or more preferably on the storage medium of a server 104x of the IM system provider (storing the contact list at a server 104x advantageously allows the contact list to be made available even if the user is logged on to a different terminal 102 and/or instance of the client application 222). In order to become a contact of another, remote user, the local user must either (i) send a contact request to the client 222 of the remote user which the remote user then selects to accept, or (ii) receive a contact request from the remote user which the local user selects to accept. Sending a contact request comprises the requesting user indicating a username or ID of the requested other user to his or her local client 222, and the client 222 then looking up a network address for the other user's terminal 102 in a look-up table or database mapping usernames or IDs to addresses (e.g. IP address in the case of the Internet), and sending the request to that address. The look-up table may be implemented either at a server 104 and/or as a distributed database distributed amongst the user terminals 102 of the users themselves in accordance with a peer-to-peer topology. The acceptance process may also involve an authentication process, e.g. comprising authentication by a server 104 and/or an exchange of cryptographically signed authentication certificates by which the clients 222 can verify each other's identity. The client engine 226 in each client 222 manages the sending and acceptance of contact requests. Thus the client 222 is configured to ensure that text-based IM type messages (or indeed other types of communication) can only be conducted between users who have selected to become mutual contacts of one another.

The contact panel 304 lists the contacts of the local user, and may also include additional information such as presence information next to each contact's name, e.g. indicating that the user is offline (x), online and available ( ) or online but has selected to be unavailable (-) (preferably the presence is at least partially defined by the respective contact him or herself).

The user interface may also comprise a second profile panel 306 in which profile information of a selected one or more of the contacts is displayed. For example if just one contact is selected in the left-hand contact panel 304, then the second profile panel may display contact information of just that one contact (e.g. Colin in FIG. 3*a*). The profile information could include for example username, real name, profile or avatar picture, mood message, current geographical location, time, gender and/or date of birth etc. If on the other hand multiple contacts are selected from the left-hand contacts panel 304, then the second profile panel 306 may display reduced profile information for the multiple selected contacts (e.g. Colin, Alan and Jane in FIG. 3*b*). In one embodiment the multiple contacts may be selected by "dragging and dropping" them from the contact panel 304 into the second profile panel 306.

Furthermore, the user interface comprises a communications panel 308. This comprises at least a message window 314 for exchanging IM type chat messages with the one or more selected contacts, and optionally additional controls for initiating voice calls, video calls and/or file transfers with the one or more selected contacts.

When a user wishes to send an IM message, he or she creates a group of participants comprising him or herself and one or more other users selected from the contacts panel 304. The sending user then types a text-based message into the message window 314 (a separate box in the message window 314 may be provided for this purpose), and sends the message by actuating a suitable control, e.g. pressing enter or clicking an on-screen control. The client 222 on the sending terminal 102 then uses the username of the one or more other, recipient participants to look up the corresponding IP address or addresses in the address look-up table (again implemented at either a server and/or a distributed P2P data base); and then send the message over the Internet to the client(s) 222 on the receiving terminal(s) 102. Another step of authentication may also be performed at this stage, e.g. by a server and/or by exchange of certificates.

The UI layer 228 of the client application 222 is configured to concatenate related messages into threads of conversation—that is to say, arranges them into time order within the message window 314 so as to represent the logical chain of message exchange (preferably including both sent and received messages). The message window 314 is preferably arranged to become scrollable when the thread extends beyond the on-screen size of the message window.

A thread is preferably defined by the messages exchanged amongst a group of the same contacts, these being referred to as the participants of the thread; although a thread could alternatively or additionally be defined by another one or more criteria such as a date period or a designated topic.

A digital record of the messages of each thread is maintained by the instant messaging system. This could be achieved in a number of ways. In one embodiment each client 222 involved in a thread maintains its own local record of the messages, e.g. in its own local non-volatile memory such as an internal or external hard drive or flash memory, or other form of local magnetic or electronic storage. Alternatively or additionally, the clients could share details of the messages they send or receive with a server 104 so that the record for each thread can be maintained there. The server 104 could also maintain a per-user record of all message traffic, as the local storage would do. The server could be a server 104*x* of the IM system provider, or a third-party server 104*y*. Whatever the means of recordal, the record comprises the text content of the message, a time at which the message was sent or received, an identification of the participants of the thread, and preferably a separate identifier of the thread. In the case where the records are maintained at least partially or wholly at a server, they could be assigned according to a global system of identifiers so that a thread can be uniquely identified within the instant messaging system regardless of the terminal from which it is accessed.

Figure 3C:
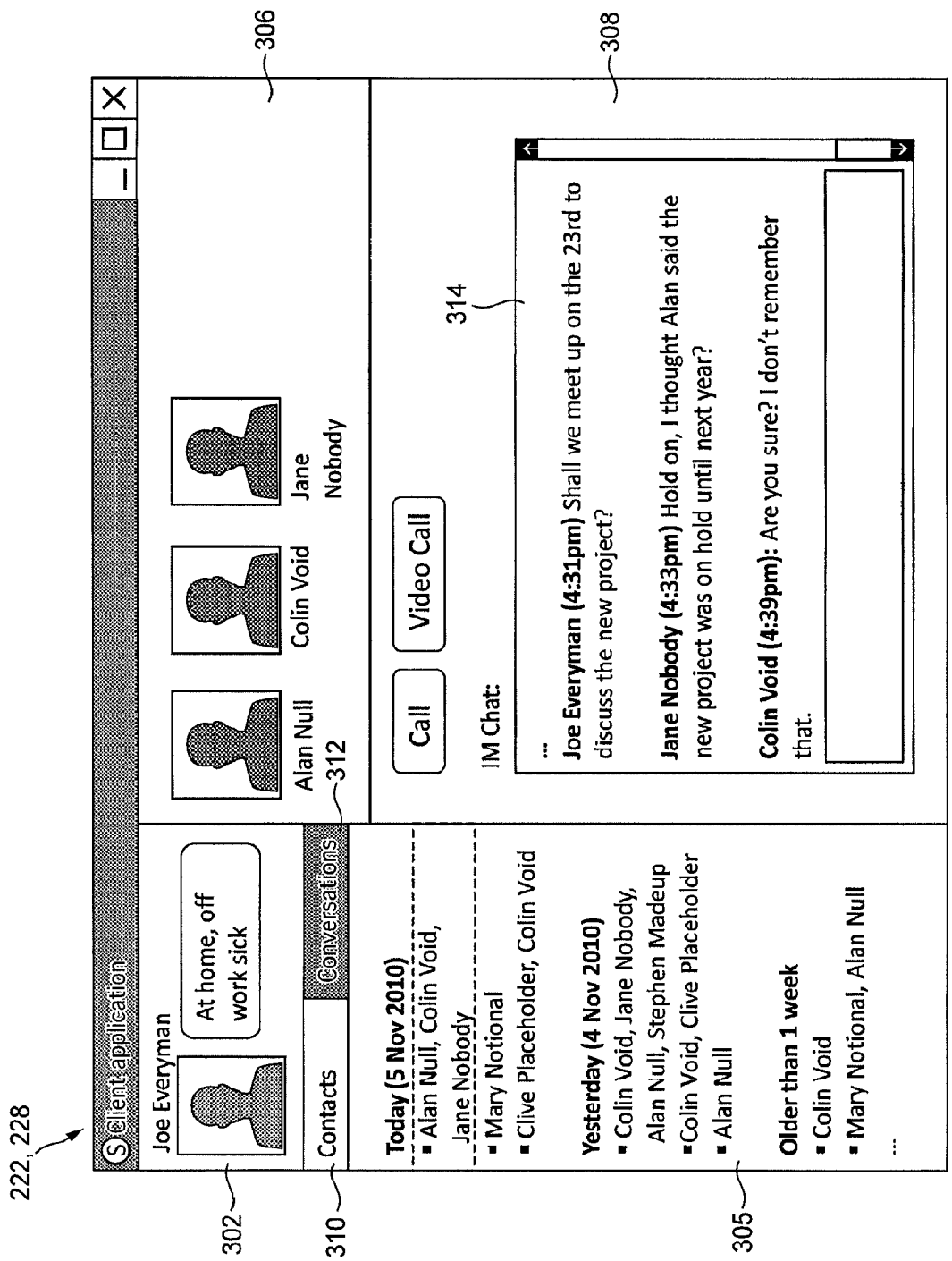

As shown in FIG. 3*c*, the user interface may further comprise controls such as tabs 310 and 312 arranged over the contact panel 304, these being a contact tab 310 and a conversations tab 312. When the conversation tab 312 is selected by the user, a conversations panel 305 is displayed in place of the contact panel 304; and vice versa if the contacts tab 310 is selected then the contact panel 304 is displayed in place of the conversation panel 305.

When displayed, the conversations panel 305 shows a list of recent threads of IM conversation. When the user selects one of the threads, then at least some of the messages of this thread are retrieved from the relevant record in the storage medium 204 or 104 and displayed in the message window 314. Retrieved messages are again arranged into the logical order of the thread of conversation they represent. Any messages that are not immediately retrieved and/or displayed, e.g. due to lack of space on the screen or conciseness considerations, can be summoned by a suitable control in the user interface such as a scroll bar on the side of the message window 314. An example of a thread of messages between Joe, Alan, Colin and Jane is shown in the message window 314 of FIG. 3*c*.

It will be appreciated that many other variants of the user interface are possible, e.g. the contacts panel 304 and conversations panel 305 could be arranged together simultaneously on screen, or could be selectable by different controls other than the tabs 310 and 312.

A feature which distinguishes instant messaging over, say, email is that when new messages are received that are part of the same logical chain of conversation as previously received messages, these are concatenated together by the IM client at the recipient terminal into the same thread and displayed as such in the same window or panel (e.g. 314). In embodiments, the IM clients may also exchange real-time information about the current activity of the participants of a particular thread, e.g. a typing indicator which indicates when a remote participant is typing.

A distinction over web-based forums, blogs or micro-blogging sites or such like is that IM messages are transmitted from the sender for delivery only to specific, identified, selected individual participants, rather than being available to any member of the forum regardless of the intention of the message sender. In an IM thread, the group of participants are all contacts of one another and the group has been specifically selected by one of those participants. The message exchange is exclusive to the selected group of participants. For any given message, one of the group of contacts participating in the thread is the sender the message and that sender identifies the other, intended recipient participants of the group (whether by reference to the identity of a group or reference to the individuals of the group). An indication of the identity of the recipients is contained within the message as transmitted from the sender (either identifying the participants individually or by identifying a previously defined group).

Also in some embodiments, unlike email, web forums or blogs etc., IM chat messages may be transmitted directly between from senders terminal 102 to the one or more recipients' terminals 102 without an intermediate server; although some systems may also provide a server 104 which can store messages for later delivery if one of the contacts involved in a particular thread is offline at the time the message is sent. Further, other embodiments of an IM system may be fully server-mediated in that messages are always transmitted via a server even if the recipient is online.

According to the present invention, the functionality of instant messaging is enhanced by applying a processing step at a recipient terminal to processes a received message citing a previous message, and to thereby recover a context of the cited message. In a preferred embodiment, this is facilitated by a machine-readable token inserted into the later message by the transmitting terminal.

An example embodiment of the present invention is now described with reference to FIGS. 3c-3g and FIG. 4.

Here, Joe, Alan, Colin and Jane are participants in a current thread of conversation conducted by means of the instant messaging system. FIG. 3c shows the user interface of Joe's instance of the IM client application 222 when executed on his user terminal 102a, including the current thread being displayed in the message window 314 and that thread being shown as selected in the left-hand conversations panel 305.

Messages will continue to be displayed in the message window 314 in time order as they are transmitted from the local user (Joe) to the other remote participants and as they are received from those other remote participants, thus reflecting the logical chain of conversation. If the thread becomes too long for all messages to be simultaneously displayed, the older messages will scroll off the top of the message window 314 whilst the newest message enters at the bottom, and so forth.

Figure 3D:
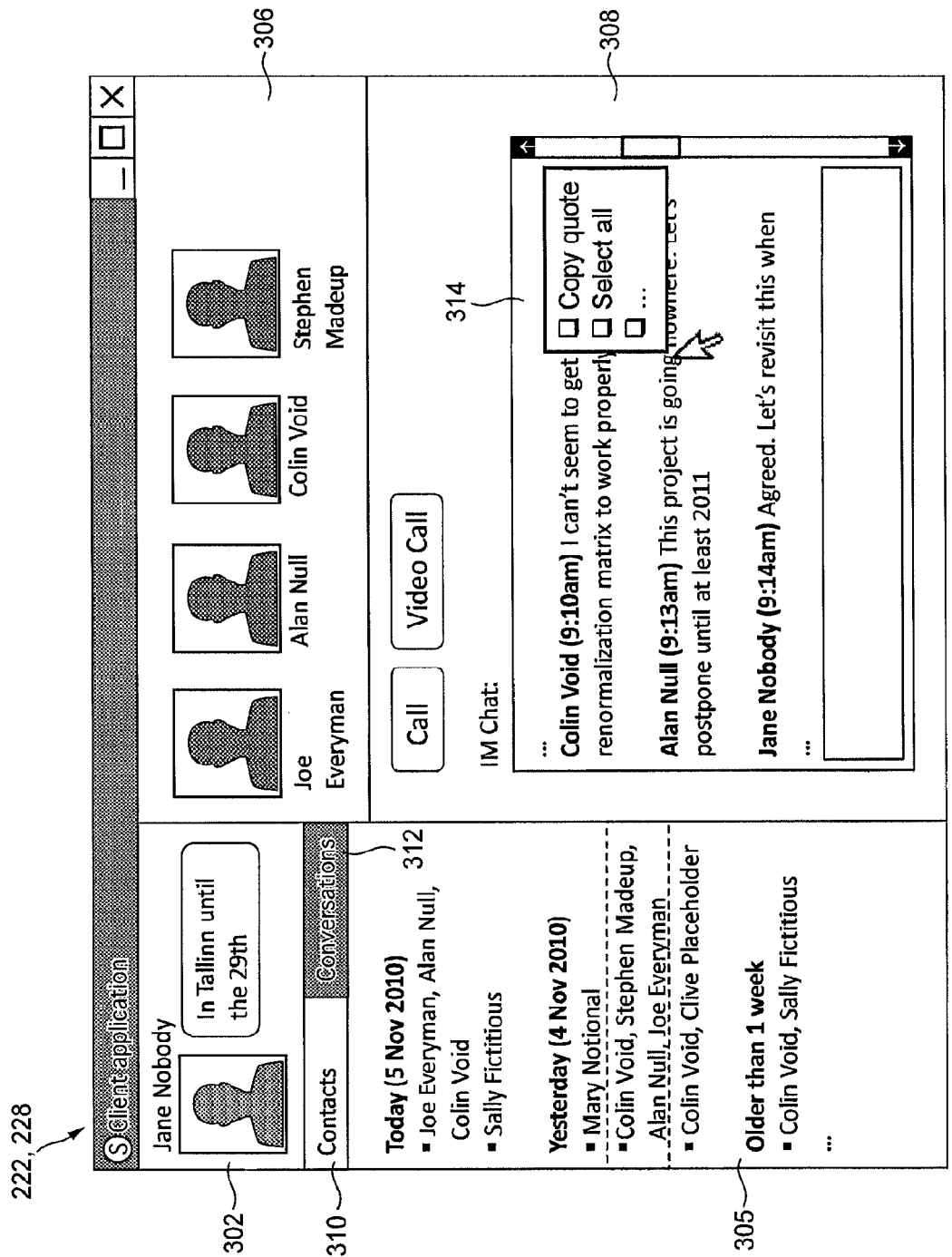

For the sake of example, say the situation arises where Jane wishes to retrieve a quotation of a previous message for the benefit of the other participants, e.g. a message from another, earlier thread. FIG. 3d shows the user interface of Jane's instance of the IM client application 222 when executed on her user terminal 102c. Jane navigates to the earlier thread by selecting it from the conversations panel 305, and thus summons the earlier thread to be retrieved from the record in the relevant storage medium 204 or 104 and displayed in the message window 314 in place of the current thread. She may then scroll through the earlier thread to find the message she wishes to quote, and select that message, e.g. by summoning a short menu with a right-click on the message in question.

Figure 3E:
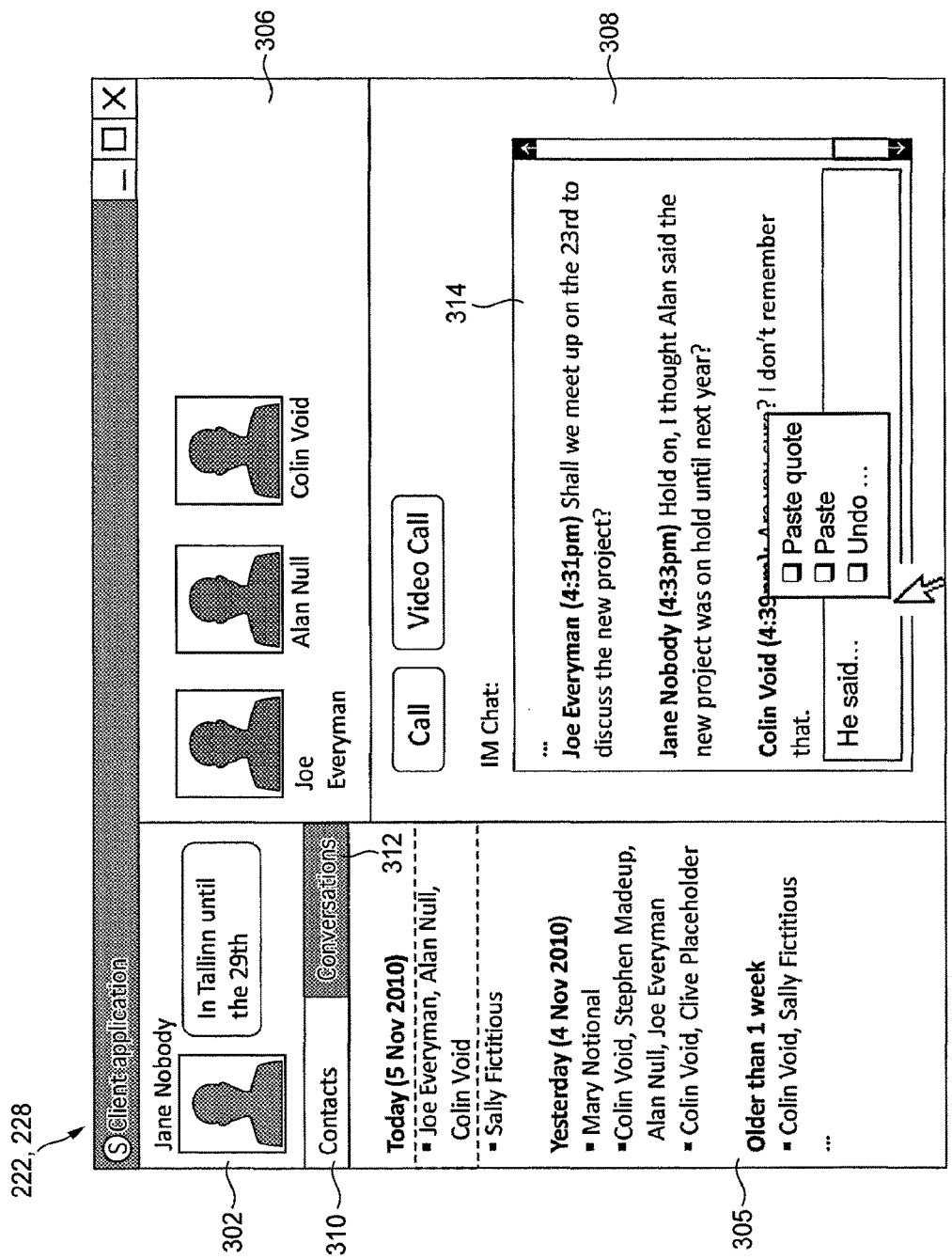

Turning to FIG. 3e, Jane then navigates back to the current thread using the conversations panel 305 and pastes the quote into the message window 314 (optionally also including some new text of her own, e.g. "He said . . . ,"). A separate box of the message window 314 may optionally be provided for typing and pasting new message to be transmitted. Note that in embodiments the quote need not necessarily be an exact verbatim citation but could alternatively be another form of citation such as a truncated or abbreviated citation.

When Jane actuates the sending of the newly composed message containing the citation, the IM client 222 transmits this from her terminal 102a to the other user terminals 102a, 102b, 102d of the other participants of the thread, in accordance with the principles of instant messaging. The ability to paste quotes into IM chat messages does already exist in an IM client. However, in accordance with a preferred embodiment of the invention, the IM client also automatically inserts a computer-readable token into the message providing additional control information relating to the citation. (Note there may be a privacy issue in that some recipients may not have been privy to the originating thread—a possible authorisation process to address this is discussed shortly.)

Figure 4:
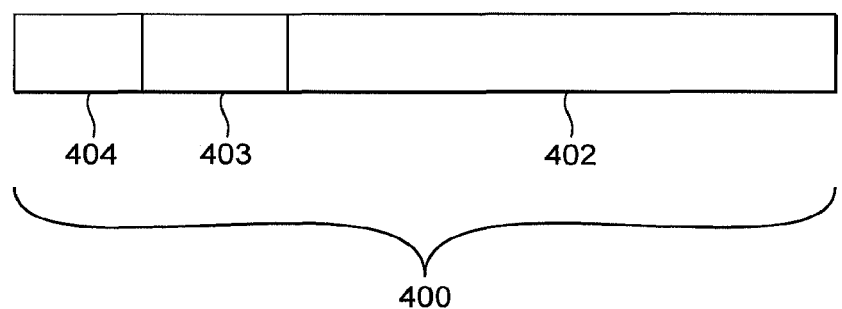
FIG. 4 is a schematic representation of a transmitted message.

FIG. 4 gives a schematic representation of an IM message 400 as generated for transmission by the client 222 according to a preferred embodiment of the present invention. This comprises the text content of the message 402, an indication of the identities of the indented recipient participants 403, and the computer-readable token 404. Without the token 404, the citation would exist as no more than any other text content 402 of the message. However, the token 404 provides an additional computer-readable information indicating details of the citation, which can be interpreted by the recipient terminals 102a, 102b and 102c. This will be illustrated further in the following.

Figure 3F:
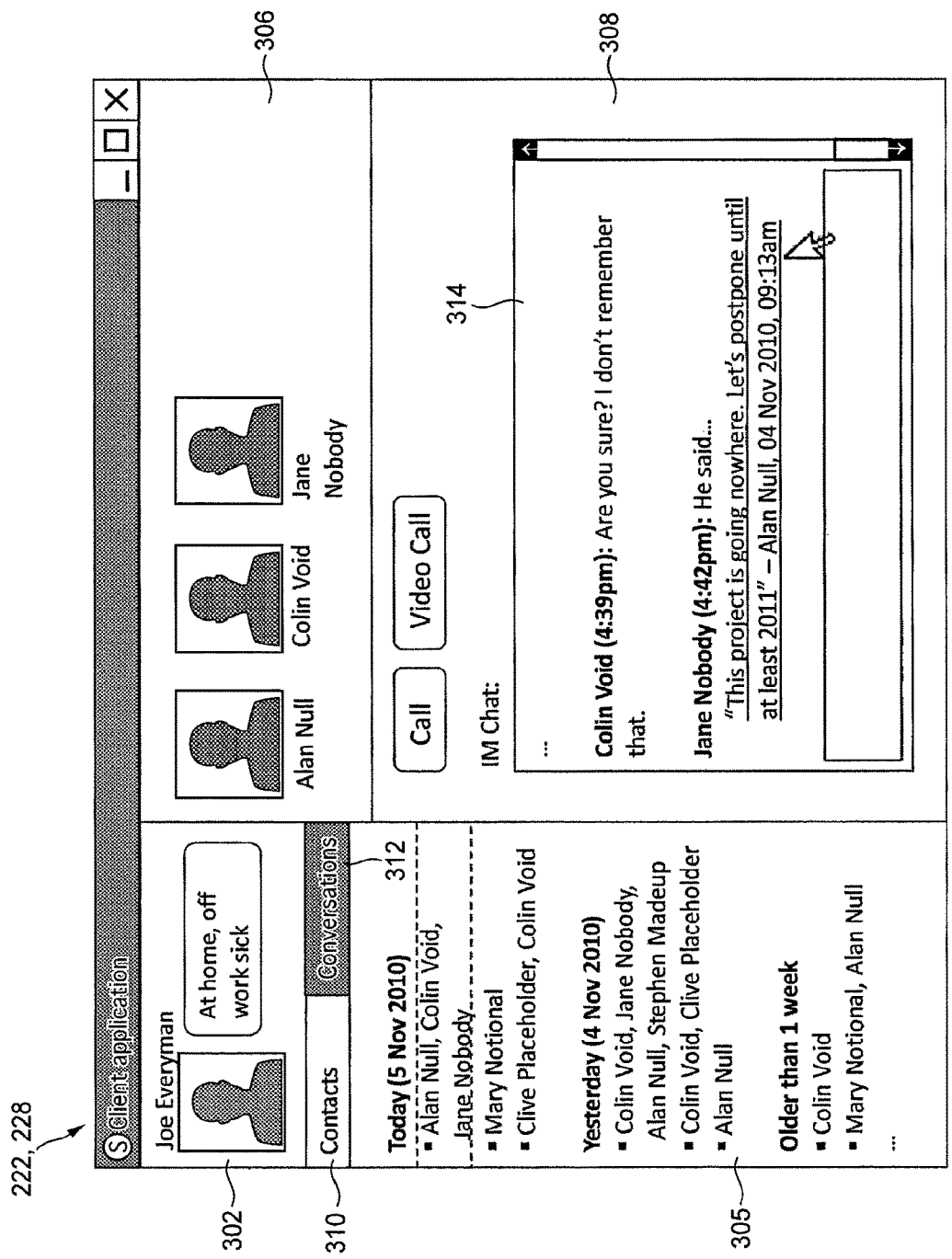

FIG. 3f shows the user interface of the client 222 at the terminal 102a of a recipient, Joe. The text 402 of the new message from Jane newly appears at the bottom of the message window 314, whilst older messages disappear off the top. If the text content 402 or part of that content is indicated in the message as being a citation, it can be displayed by the recipient client 222 in a distinct format in the message window 314, e.g. indented, in italics, underlined, highlighted and/or in inverted commas.

Furthermore, whilst the ability to paste quotes into IM chat messages does already exist in an IM client, the enhanced IM client of present invention applies an additional processing step to the message so as to recover a context of the cited quote by reference to the stored records for the relevant thread. The client 222 running on the recipient terminal 102a processes the message to locate where the cited quotation existed in relation to other messages of its respective thread, and automatically provides means assisting in recovering that context.

Figure 3G:
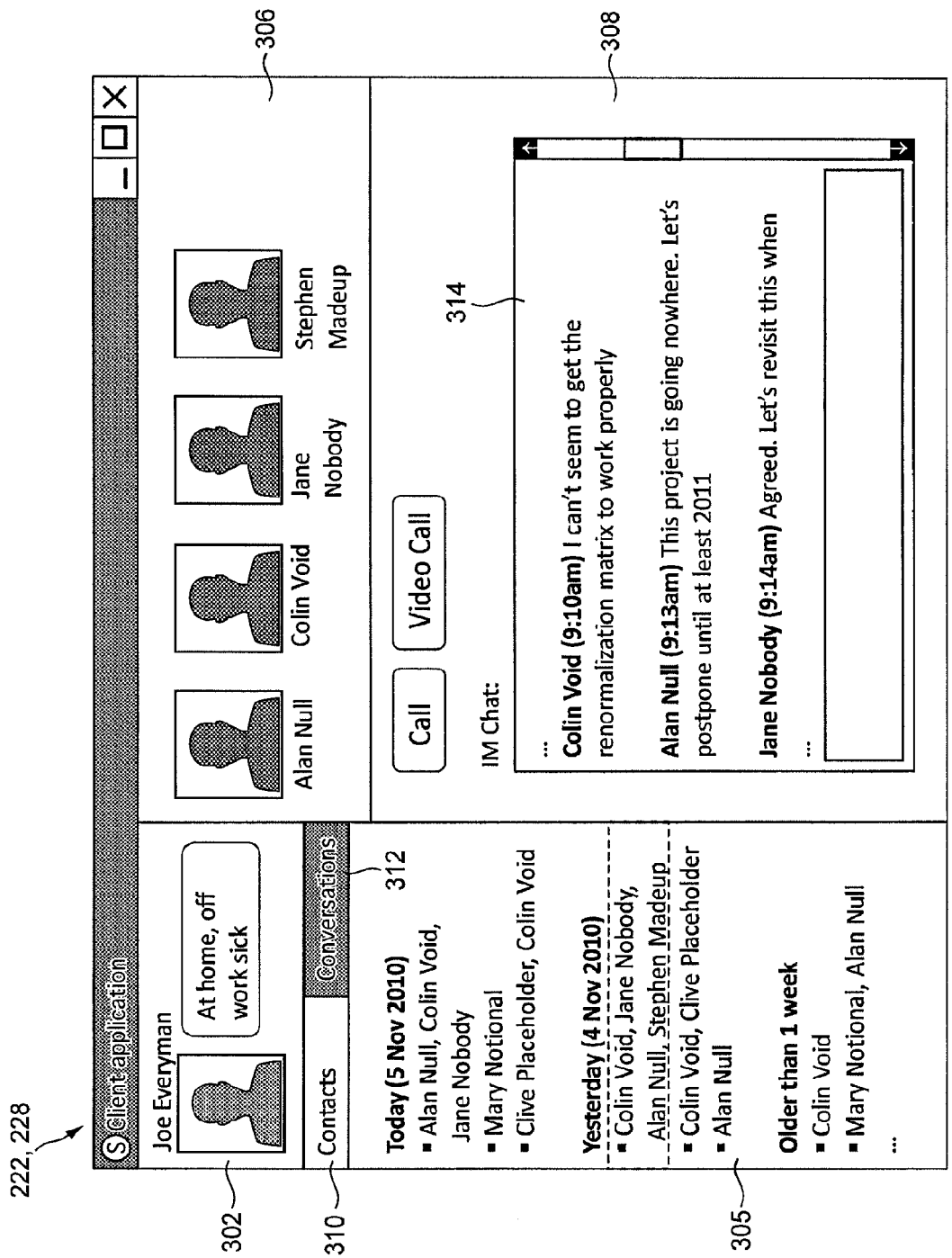

An example of this is illustrated by the transition from FIGS. 3f to 3g. In FIG. 3f the citation is shown within the current thread in Joe's message window 314 as an on-screen control that can be actuated by Joe (the recipient user), e.g. as a hypertext type link that can be actuated by clicking the citation. In the illustrated case where the citation is of a message from a different thread, this actuation causes the client 222, based on the processing step, to switch to the thread of the cited message as shown in FIG. 3g. The switching operation comprises the client 222 on the recipient terminal 102a retrieving one or more other messages of the cited message's thread from the records in the relevant storage medium 204 and/or 104 (preferably one or more adjacent messages), and displaying them together with the cited message in the message window 314 in the logical order of the cited thread.

As an alternative to displaying the cited message as a control that can be directly activated by the recipient user, the recovery of the context of the cited message could instead comprise generating an indicator within the user interface directing user towards an existing control. For example, referring to FIG. 3f the indicator could highlight the thread of the cited message in the conversations panel 305 on the left of the user interface. The recipient user (Joe) can then summon the relevant thread by selecting the highlighted conversation in the conversation panel 305.

Either way, in a particularly preferred embodiment the processing applied by the recipient client 222 in order to perform this recovery is facilitated by the computer-readable token 404 included in the new message 400, which may include control information identifying the thread of the cited message and/or the location of the cited message within its respective thread. The client 222 running on the recipient terminal 102a can ten interpret the token 404 electronically, and thus recover the context by reading the location encoded into the token 404. However, a less preferred option for processing the cited message would be for the client 222 on the recipient terminal 102a to search the records in the relevant storage medium 204 and/or 104 for a match with the cited message, and thus locate it by a more "brute force" means.

Thus the present invention effectively allows users to track copy and paste operations in an instant messaging client, and aids the recipient user (or users) in navigating between threads or within a given thread so as to determine the context of a cited message.

In the case of creating a link from the current thread to a cited thread, the client 222 on at least one of the sending terminal 102c and/or the recipient terminal 102a is preferably configured to apply an authorization process to check that both users were participants of both threads. A user who was not a participant of a cited thread should not be allowed to recover the messages of that thread from the storage medium 204 or 104. In the case where records are stored at a server 104, the authorization could alternatively or additionally be applied at the server.

Figure 5A:
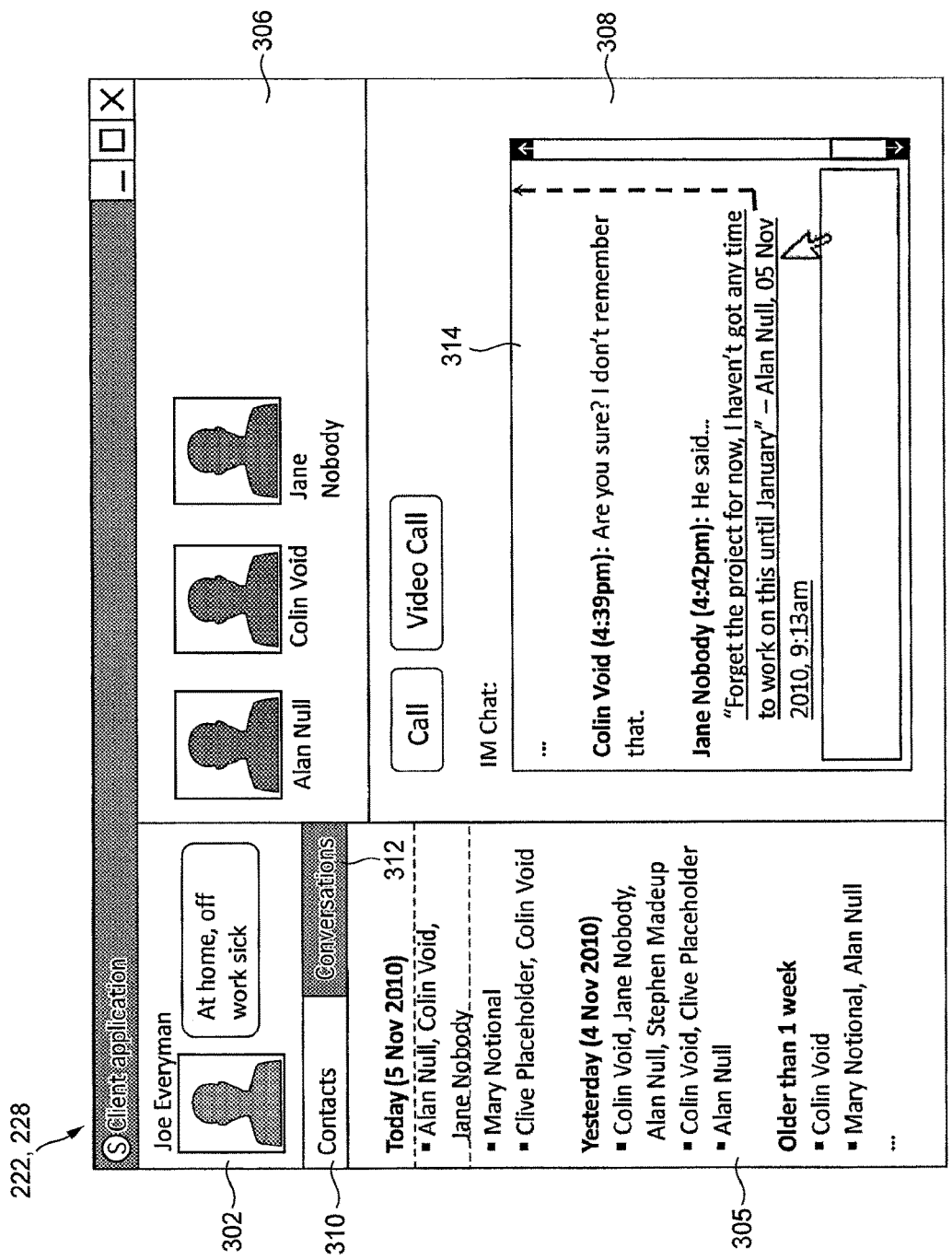
FIGS. 5a-5b provide further schematic illustrations of a user interface.
Figure 5B:
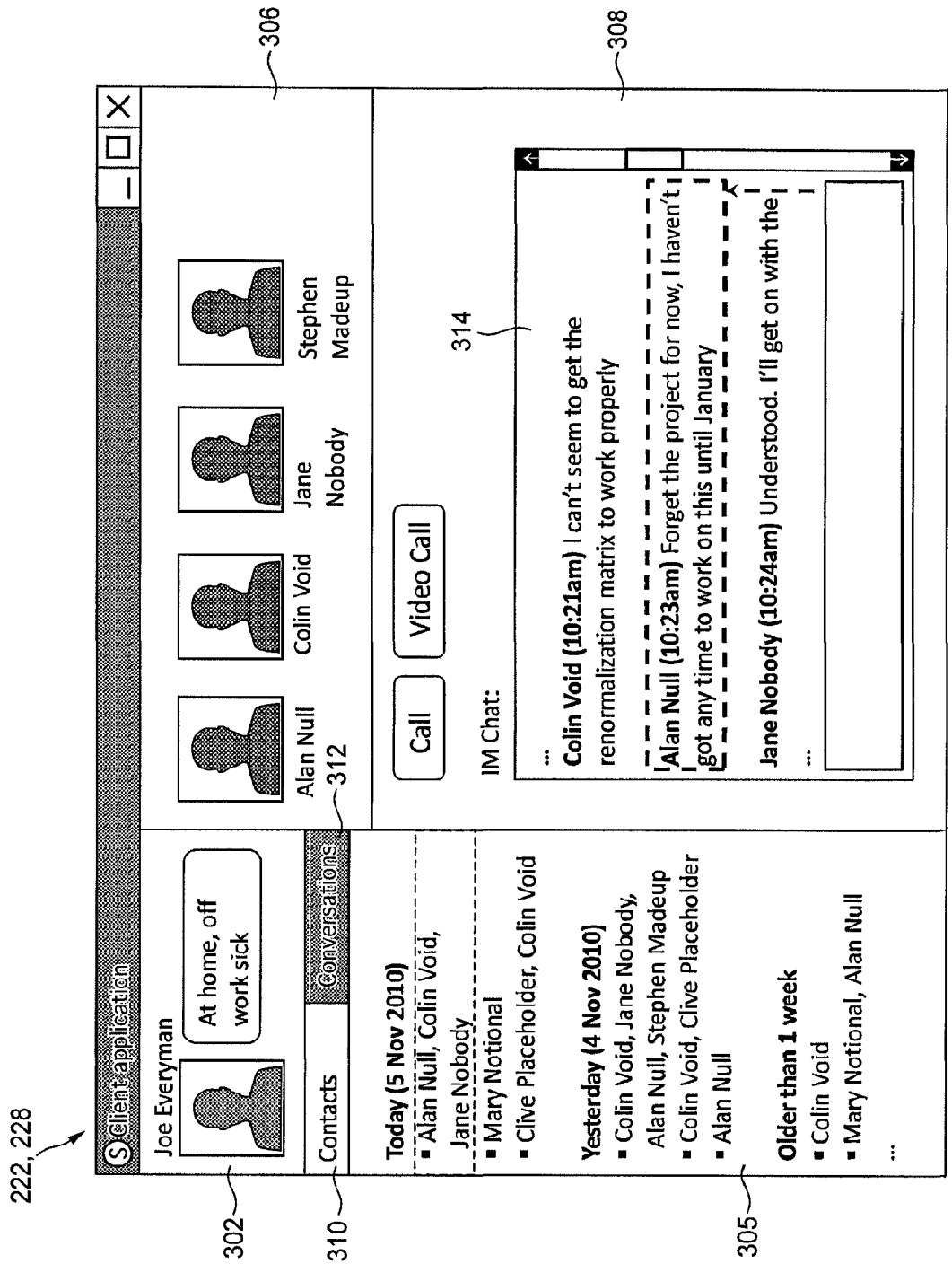

Another example of the present invention is illustrated in FIGS. 5a and 5b. In this example, the citation is of a message that was exchanged at an earlier time or date within the same thread (e.g. between the same group of participants). Jane has copied and pasted the message in a similar manner as described in relation to FIGS. 3d and 3e, but by scrolling back through the current thread rather than navigating between two different threads. Again, when Jane sends the new message with the citation, her client application 222 preferably inserts a computer-readable token 104 indicating the location of the cited message within the thread.

FIG. 5a shows an example of the user interface at the recipient terminal 102a. Here, the recipient client 222 may generate an on-screen control such as a link which when actuated by the recipient user (Joe) automatically scrolls back through the current thread to the earlier, cited message as shown in FIG. 5b and thereby recover the context. This operation comprises the client 222 on the recipient terminal 102a retrieving one or more other messages from the current thread from the records in the relevant storage medium 204 and/or 104, and displaying them together with the cited message in the message window 314 in the logical order of the cited thread. Alternatively or additionally, the recovery process may comprise generating an indicator within the user interface directing the recipient user towards an existing control by which he can navigate back to the cited message, e.g. a dotted line within the message window 314 leading back from the citation to the cited message itself as shown in FIGS. 5a and 5b.

Again, either way the recovery is preferably facilitated by the computer-readable token 404 included in the new message 400, which may include control information identifying the location of the cited message within its respective thread; though a less preferred option would be to search the records for a match with the cited message.

As mentioned above, in further embodiments the server 104 could also maintain a per-user record of all message traffic, as well as per-thread. This would allow any features related to analysis of user behaviour and/or inputs from the user to also be provided from the server side.

In yet further embodiments, the client 222 may be configured to provide automatic detection of a thread when composing a message. For illustrative purposes consider the starting situation is FIG. 3g, and Jane Nobody then composes a message: "I'm not sure about the renormalisation; I think the infinities might be real! . . . ." The client 222 may be configured to perform a keyword matching process, e.g. applying an heuristic that takes into account the uniqueness, rarity, frequency and/or the context of the match, etc. On this basis the client 222 could identify this message as relating to Colin's with a reasonably high degree of confidence, e.g. based on detecting the term "renormalisation". The client 222 would be configured such that when this match occurs, it identifies the potential thread and indicates this thread in the user interface (UI). The UI may be configured to then automatically create a thread unless the user rejects it (like an autocomplete feature on a mobile phone), or to prompt the user to create a thread. Techniques other than a straight keyword match may also be used—possible other heuristics involving for example synonyms or improper nouns could be applied. Generally and heuristics based on linguistic analysis could be used. For example, consider two consecutive sentences with the proper noun in the first sentence but not the second, or only a keyword match in the second which would also tie the first message into the thread. E.g. in a sequence of messages: Jane, "I'm not sure that will work"; Frank, "Bobo the monkey is in the breakroom again"; Jane, "The renormalization is degenerate"; a heuristic analysis could detect both of Jane's statements as being part of a certain thread with a high degree of confidence. Other linguistic techniques could also be applied for this kind of analysis.

Once a thread is created, the feature could also make it quick and easy to add messages to the thread, without the user having to do a per-message operation. Some possible approaches are: making the thread state "sticky" in that conversation until it is cancelled, making a separate virtual conversation for that thread, having its own UI element, and/or providing a temporary short tag to identity the thread, such as @1 or #1 which could be quickly typed.

In still further embodiments, the client 222 may be configured to provide an enhanced visualization of links from the current chat to other chats. For example, the client 222 may be configured to provide the user with a list or visual map of linked chats to the current chat.

It will be appreciated that the above embodiments have been described only by way of example. The scope of the present invention is not limited by the described embodiments, but only by the appendant claims.

What is claimed is:

1. A computer-implemented method comprising:
receiving, at an instant messaging client application executing on a first device, a text-based message from a second device over a communication network, the text-based message including a citation of a previously-communicated text-based message and a token, the token comprising context information identifying a thread of the previously-communicated text-based message and a location of the previously-communicated text-based message within the thread, the text-based message part of a different thread than the thread of the previously-communicated text-based message;
processing the text-based message at the first device to extract the token from the text-based message, and using the token to recover one or more other previously-communicated text-based messages of the thread; and
causing display of an on-screen control that, responsive to selection, causes the instant messaging client application to switch from display of the text-based message to display of the previously-communicated text-based message and the one or more other previously-communicated text based messages of the thread arranged in an order in which the previously-communicated text-based message and the one or more other previously-communicated text-based messages were received in the thread.

2. The computer-implemented method of claim 1, wherein the citation comprises a human-readable citation of the previously-communicated text-based message.

3. The computer-implemented method of claim 1, wherein the context information of the previously-communicated text-based message provides a context of the previously-communicated text-based message in relation to the one or more other previously-communicated text-based messages in the thread.

4. The computer-implemented method of claim 1, wherein using the token to recover the one or more other previously-communicated text-based messages of the thread comprises retrieving the one or more other previously-communicated text-based messages associated with the thread from a storage medium.

5. The computer-implemented method of claim 1, further comprising maintaining a record of the thread of the previously communicated text-based message in a storage medium located at the first device.

6. The computer-implemented method of claim 1, further comprising accessing a record of the thread of the previously-communicated text-based message from a storage medium at a server.

7. The computer-implemented method of claim 1, further comprising auto-detecting the thread of the previously-communicated text-based message if the previously-communicated text-based message was composed at the first device.

8. The computer-implemented method of claim 7, wherein the auto-detection is based on at least one of:
one or more keywords in the previously-communicated text-based message; or
a linguistic analysis of the previously-communicated text-based message.

9. The computer-implemented method of claim 1, wherein the on-screen control is displayed as a selectable link configured to cause the first device to switch between the threads responsive to actuation of the on-screen control.

10. The computer-implemented method of claim 1, wherein an authorization procedure is performed at the first device to ensure that the switching between threads is conditional upon the user of the first device having been a legitimate participant of the thread of the previously-communicated text-based message.

11. A computer-implemented method comprising:
generating a text-based message comprising a human readable citation of a previously-communicated text-based message responsive to a paste operation to paste text from the previously-communicated text-based message into the text-based message;
automatically generating and inserting a computer-readable token into the text-based message responsive to the paste operation, the computer-readable token comprising context information identifying a thread of the previously-communicated text-based message and a location of the previously-communicated text-based message within the thread, the text-based message part of a different thread than the thread of the previously-communicated text-based message; and
transmitting the text-based message to a device over a communication network to enable processing, at the device, of the computer-readable token to recover the context information, the human readable citation of the previously-communicated text-based message selectable, at the device, to switch from display of the text-based message to display of the thread of the previously-communicated text-based message.

12. The computer-implemented method of claim 11, wherein the citation comprises a human-readable citation of the previously-communicated text-based message.

13. The method of claim 11, wherein the context information of the previously-communicated text-based message provides a context of the previously-communicated text-based message in relation to one or more other previously-communicated text-based messages in the thread.

14. A computing device comprising:
at least a memory and a processor to implement a client application executing on the computing device, the client application configured to perform operations comprising:
receiving, at an instant messaging client application executing on a first device, a text-based message from an additional computing second device over a communication network, the text-based message including a citation of a previously-communicated text-based message and a token, the token comprising context information identifying a thread of the previously-communicated text-based message and a location of the previously-communicated text-based message within the thread, the text-based message part of a different thread than the thread of the previously-communicated text-based message;
processing the text-based message at the first computing device to extract the token from the text-based message, and using the token to recover one or more other previously-communicated text-based messages of the thread;
causing display of an on-screen control that, responsive to selection, causes the client application to switch from display of the text-based message to display of the previously-communicated text-based message and the one or more other previously-communicated text based messages of the thread arranged in an order in which the previously-communicated text-based message and the one or more other previously-communicated text-based messages were received in the thread.

15. The computing device of claim 14, wherein the citation comprises a human-readable citation of the previously-communicated text-based message, and wherein the context information of the previously-communicated text-based message provides a context of the previously-communicated text-based message in relation to the one or more other previously-communicated text-based messages in the thread.

16. The computing device of claim 14, wherein using the token to recover the one or more other previously-communicated text-based messages of the thread comprises retrieving the one or more other previously-communicated text-based messages associated with the thread from a storage medium.

17. The computing device of claim 14, wherein the client application is configured to perform operations further comprising auto-detecting the thread of the previously-communicated text-based message if the previously-communicated text-based message was composed at the first device.

18. The computing device of claim 17, wherein the auto-detection is based on at least one of:
   one or more keywords in the previously-communicated text-based message; or
   a linguistic analysis of the previously-communicated text-based message.

19. The computing device of claim 14, wherein the on-screen control is displayed as a selectable link configured to cause the first device to switch between the threads responsive to actuation of the on-screen control.

20. The computing device of claim 14, wherein an authorization procedure is performed at the first computing device to ensure that the switching between threads is conditional upon the user of the first computing device having been a legitimate participant of the thread of the previously-communicated text-based message.

\* \* \* \* \*